(12) United States Patent
Chang

(10) Patent No.: US 11,953,715 B2
(45) Date of Patent: Apr. 9, 2024

(54) BACKLIGHT MODULE

(71) Applicant: AUO Display Plus Corporation, Hsinchu (TW)

(72) Inventor: Chih-Kao Chang, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 18/207,155

(22) Filed: Jun. 8, 2023

(65) Prior Publication Data

US 2023/0324600 A1 Oct. 12, 2023

(30) Foreign Application Priority Data

Apr. 18, 2023 (TW) .................... 112114376

(51) Int. Cl.
*F21V 8/00* (2006.01)

(52) U.S. Cl.
CPC .......... *G02B 6/0085* (2013.01); *G02B 6/009* (2013.01)

(58) Field of Classification Search
CPC .. G02B 6/0093; G02B 6/0021; G02B 6/0086; G02F 1/133308; G02F 1/133615; G02F 1/133317; G02F 1/133608; G02F 2201/46; G02F 2201/503; G02F 1/133314; G02F 1/1333; G02F 1/13332; G02F 1/133325; G02F 2201/50; F21V 8/00

See application file for complete search history.

(56) References Cited

U.S. PATENT DOCUMENTS

| 7,377,682 B2 * | 5/2008 | Chang | G02B 6/0091 |
| | | | 362/633 |
| 2013/0286294 A1 * | 10/2013 | Hosoki | G02B 6/0091 |
| | | | 348/739 |

FOREIGN PATENT DOCUMENTS

| CN | 216286087 U | 4/2022 |
| TW | 201245820 A1 | 11/2012 |
| TW | I409547 B1 | 9/2013 |
| TW | 201518809 A | 5/2015 |

* cited by examiner

*Primary Examiner* — William J Carter

(57) ABSTRACT

A backlight module includes a light guide plate, a light source, a fixing element and an elastic element. The light guide plate has a light incident surface. The light source has a light-emitting side and a back side opposite to the light-emitting side, and the light-emitting side faces the light incident surface. The fixing element is disposed to be opposite to the back side. The elastic element is connected to the fixing element, wherein the elastic element is adapted to push the light source to be against the light incident surface.

10 Claims, 12 Drawing Sheets

BACKLIGHT MODULE

FIELD OF THE INVENTION

The present invention relates to a backlight module.

BACKGROUND OF THE INVENTION

A liquid crystal display device mainly includes a backlight module, a display panel and an outer frame, etc. Based on different ways of light entering, the backlight module can be classified into an edge-type backlight module and a direct-type backlight module. Generally, the edge-type backlight module has advantages of less thickness and low cost, while the direct-type backlight module has a better effect on local dimming, so that an image of the direct-type backlight module has better contrast.

The edge-type backlight module transforms the light generated by the light source to a surface light source via a light guide plate. However, the heat generated by the light source causes the temperature of the light guide plate to rise, thereby causing a volume of the light guide plate to expand. In the same way, the volume of the light guide plate is decreased due to a lower temperature after the light source is turned off. Hence, a distant between the light source and the light guide plate is changed according to a variance of the volume of the light guide plate, and a problem of unstable optical grade of the backlight module happens.

SUMMARY OF THE INVENTION

The present invention provides a backlight module to keep a fixed distance between a light source and a light guide plate to provide stable optical grade.

In order to achieve one or a portion of or all of the objectives or other objectives, the backlight module provided by the present invention includes a light guide plate, a light source, a fixing element and an elastic element. The light guide plate has a light incident surface. The light source has a light-emitting side and a back side opposite to the light-emitting side, and the light-emitting side faces the light incident surface. The fixing element is disposed to be opposite to the back side. The elastic element is connected to the fixing element, wherein the elastic element is adapted to push the light source to be against the light incident surface.

In an embodiment of the present invention, the elastic element is, for example, plate-shaped, and the elastic element may have a base part and an elastic part. The base part is fixed to the fixing element, and the base part is opposite to the back side. The elastic part is connected to the base part, and the elastic part is bent relative to the base part, and the elastic part is adapted to be against the back side.

In an embodiment of the present invention, the elastic part may include a first triangle, and the elastic part has a first edge and a first corner opposite to the first edge. The first edge is connected to the base part, and the first corner is adapted to be against the back side.

In an embodiment of the present invention, the elastic part further includes, for example, a second triangle. The first triangle may further have a second edge, and the second edge is adjoined between the first edge and the first corner. The second triangle has a third edge, a fourth edge and a second corner. The third edge is opposite to the second corner, and the fourth edge is adjoined between the third edge and the second corner. The third edge is connected to the base part. The second edge is adjoined to the fourth edge. The first corner is adjoined to the second corner, and the first corner and the second corner adjoined to each other are adapted to be against the back side.

In an embodiment of the present invention, the elastic part has, for example, a symmetry plane. The symmetry plane passes between the second edge and the fourth edge adjoined to each other, and the first triangle and the second triangle are symmetrical to the symmetry plane.

In an embodiment of the present invention, the elastic part may include a first quadrilateral, and the first quadrilateral has a first fixed side and a first abutted side. The first fixed side is connected to the base part. The first abutted side is opposite to the first fixed side and is adapted to be against the back side.

In an embodiment of the present invention, the elastic part further includes, for example, a second quadrilateral. The base part may include a first part and a second part separated from each other. The first fixed side is connected to the first part. The second quadrilateral has a second fixed side and a second abutted side opposite to the second fixed side. The second fixed side is connected to the second part. The second abutted side is opposite to the second fixed side and is connected to the first abutted side. The elastic part further has a symmetry plane passing between the first abutted side and the second abutted side, and the first quadrilateral and the second quadrilateral are symmetrical to the symmetry plane.

In an embodiment of the present invention, the elastic element may further have a fixing part. The light source may include a substrate and a light-emitting element, and the light-emitting element is disposed on the substrate. The light-emitting side is located on a side of the light-emitting element facing away from the substrate, and the back side is located on a side of the substrate facing away from the light-emitting element. The fixing part is connected to the base part, and the fixing part is fixed to the substrate.

In an embodiment of the present invention, the substrate may have a surface and a side surface. The surface faces away from the back side, and the side surface is connected to the surface. The fixing part is plate-shaped, and the fixing part has a first segment and a second segment. The first segment is connected to the second segment and the base part, and the first segment is opposite to the side surface. The second segment is fixed to the surface.

In an embodiment of the present invention, the elastic part may have the first fixed side and the first abutted side. The first fixed side is connected to the base part. The first abutted side is opposite to the first fixed side and is adapted to be against the back side. The fixing part is plate-shaped. The fixing part is connected to the first abutted side, and the fixing part is adapted to be against the back side.

In an embodiment of the present invention, the fixing part may have a first plate body, a second plate body and a third plate body. The first plate body is connected to the first abutted side, and the first plate body is opposite to the third plate body. The second plate body is connected to the first plate body and the third plate body. The substrate is sandwiched between the first plate body and the third plate body.

The backlight module of the present invention adopts the elastic element to push against the light source, so that the light source can be adjoined against the light incident surface of the light guide plate, or a fixed distance can be maintained between the light source and the light incident surface. Based on the above structures, a fixed distance between the light source and the light incident surface can still be maintained even if the volume of the light guide plate is changed, so the backlight module of the present invention is able to provide a stable optical grade.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
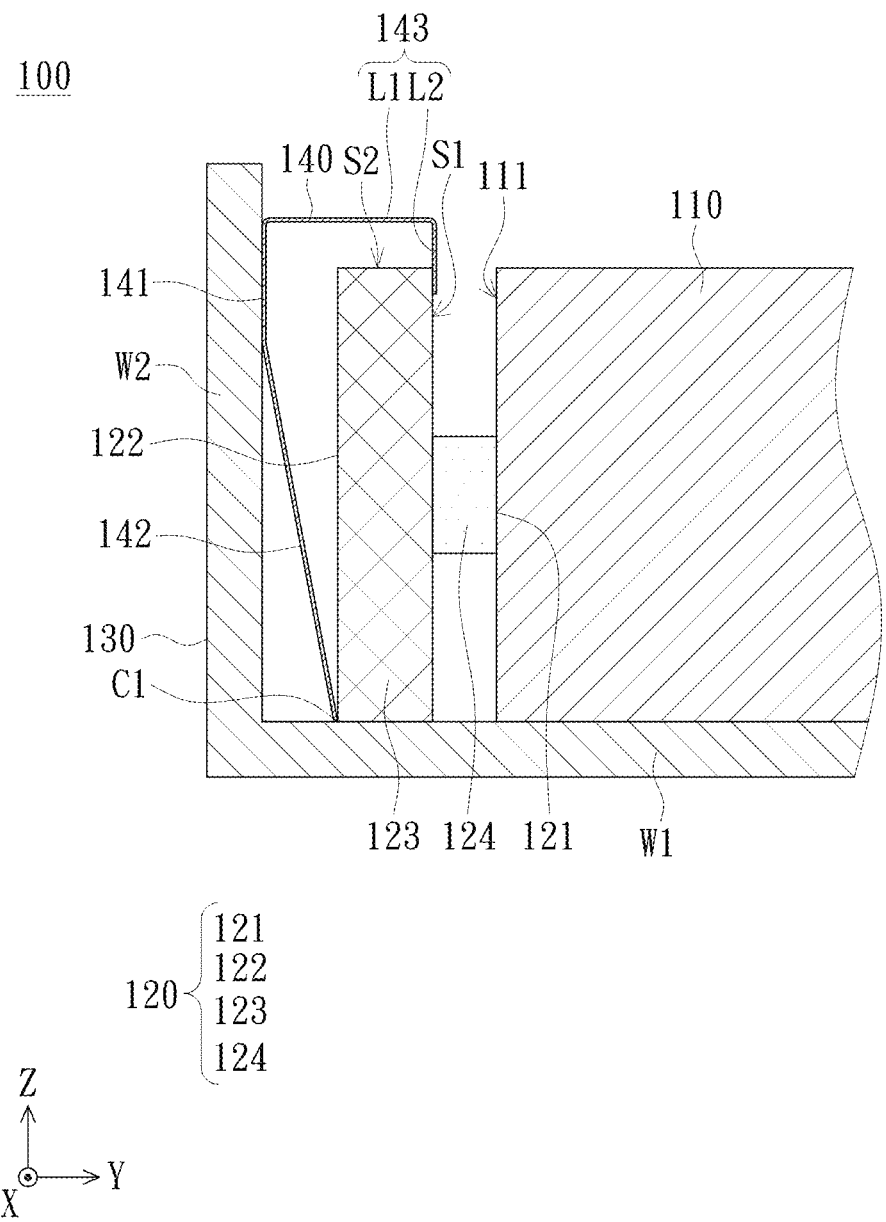
FIG. 1 is a partial cross-sectional schematic diagram of a backlight module in an embodiment of the present invention.
Figure 2:
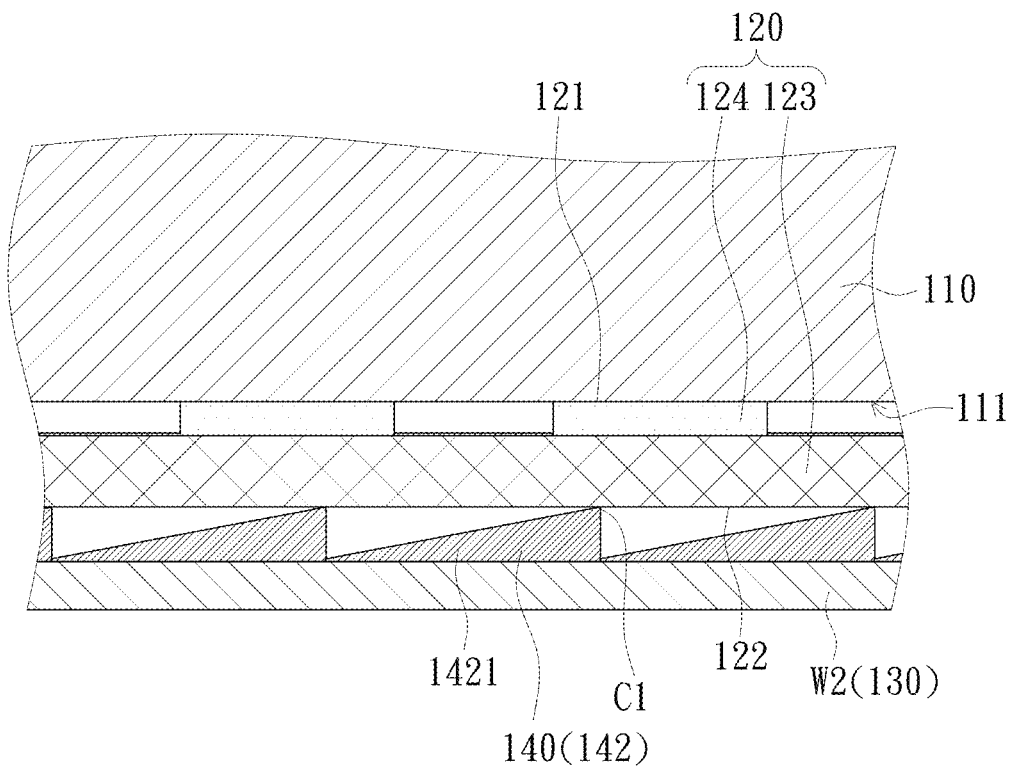
FIG. 2 is a schematic diagram of the elastic parts of the elastic elements of the backlight module in FIG. 1 pushing against the light source.
Figure 3:
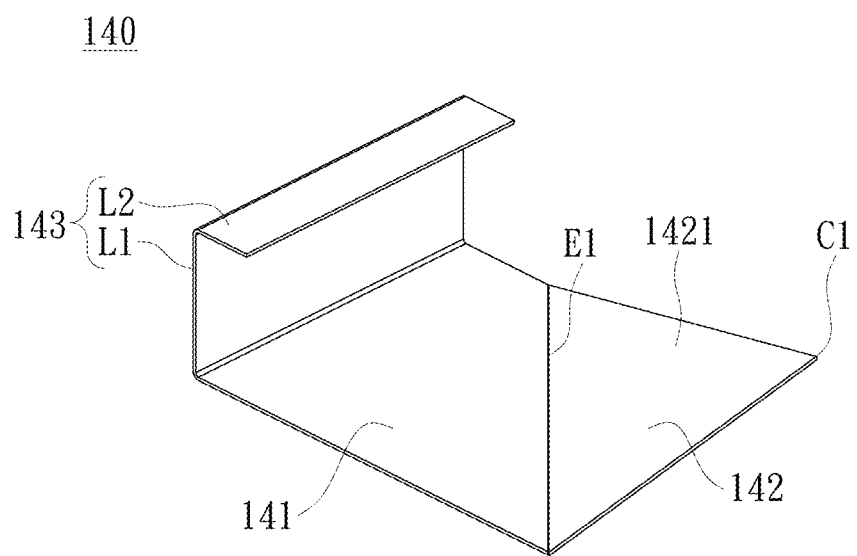
FIG. 3 is a 3D schematic diagram of the elastic element in FIG. 1.

FIG. 1 is a partial cross-sectional schematic diagram of a backlight module in an embodiment of the present invention. FIG. 2 is a schematic diagram of the elastic parts of the elastic elements of the backlight module in FIG. 1 pushing against the light source. FIG. 3 is a 3D schematic diagram of the elastic element in FIG. 1. Referring to FIG. 1 and FIG. 2, a backlight module 100 includes a light guide plate 110, a light source 120, a fixing element 130 and an elastic element 140. The light guide plate 110 has a light incident surface 111. The light source 120 has a light-emitting side 121 and a back side 122 opposite to the light-emitting side 121, and the light-emitting side 121 faces the light incident surface 111. The fixing element 130 is disposed to be opposite to the back side 122. The elastic element 140 is connected to the fixing element 130, wherein the elastic element 140 is adapted to push the light source 120 to be against the light incident surface 111.

The light beam generated by the light source 120 is emitted from the light-emitting side 121. Specifically, the light source 120 may include a substrate 123 and a light-emitting element 124, and the light-emitting element 124 is disposed on the substrate 123. The light-emitting side 121 is located on a side of the light-emitting element 124 facing away from the substrate 123, and the back side 122 is located on a side of the substrate 123 facing away from the light-emitting element 124. Furthermore, the substrate 123 is, for example, a circuit board, and the light-emitting element 124 can be electrically connected to the circuit board. The light-emitting element 124 in this embodiment may include a light-emitting diode (LED), but the present invention is not limited thereto.

In this embodiment, the elastic element 140 can push against the light source 120 from the back side 122, so that the light-emitting side 121 of the light source 120 is adjoined against the light incident surface 111 of the light guide plate 110. However, the elastic element 140 may maintain a fixed distance between the light-emitting side 121 and the light incident surface 111 in an embodiment. For example, the light source 120 may further be provided with a supporting element (not shown in the figure), and the supporting element may be against between the substrate 123 and the light incident surface 111, so that the light-emitting side 121 is separated from the light incident surface 111, and the distance between the light-emitting side 121 and the light incident surface 111 can be maintained. Referring to FIG. 1 and FIG. 3 together, the elastic element 140 in this embodiment is, for example, plate-shaped and may have a base part 141 and an elastic part 142. The base part 141 is fixed to the fixing element 130 and opposite to the back side 122. The elastic part 142 is connected to the base part 141 and bent relative to the base part 141. The elastic part 142 is adapted to be against the back side 122. In short, the elastic element 140 may be a leaf spring and can be formed by cutting and folding a metal sheet, but the manufacturing process of the elastic element 140 is not limited thereto. In addition, the base part 141 in this embodiment may be plate-shaped, so as to increase the area contacting with the fixing element 130. In this way, the base part 141 can not only be more firmly fixed to the fixing element 130, but also more quickly conduct the heat energy generated by the light source 120 to the fixing element 130, thereby improving the heat dissipation efficiency of the light source 120. Referring to FIG. 1, FIG. 2 and FIG. 3 together, furthermore, the elastic part 142 may include a first triangle 1421, and the first triangle 1421 has a first edge E1 (shown in FIG. 3) and a first corner C1 opposite to the first edge E1. The first edge E1 is connected to the base part 141, and the first corner C1 is adapted to be against the back side 122. For example, the first corner C1 may be a sharp angle, but other embodiments are not limited thereto. In addition, the shape of the base part 141 in this embodiment may be trapezoidal, but the present invention is not limited thereto.

Please continue to refer to FIG. 1 and FIG. 3. The elastic element 140 in this embodiment may further have a fixing part 143. The fixing part 143 is connected to the base part 141 and the fixing portion 143 is fixed to the substrate 123. In this way, the elastic element 140 can be more firmly fixed to the light source 120, and the fixing part 143 can also provide an additional heat conduction area, thereby improving the heat dissipation efficiency of the elastic element 140 to the light source 120. Further, the substrate 123 may have a surface S1 and a side surface S2. The surface S1 faces away from the back side 122, and the side surface S2 is connected to the surface S1. The fixing part 143 may be plate-shaped and has a first segment L1 and a second segment L2. The first segment L1 is connected to the second segment L2 and the base part 141 and is opposite to the side surface S2. The second segment L2 is fixed to the surface S1. In detail, the first segment L1 is, for example, bent relative to the base part 141, and the first segment L1 is separated from the substrate 123. In addition, the second segment L2 may be bent relative to the first segment L1 and may be, for example, substantially parallel to the base part 141. However, the first segment L1 may be fixed to the side surface S2 of the substrate 123 in an embodiment. In this embodiment, the first segment L1 and the second segment L2 may be quadrangular. The first segment L1 and the second segment L2 in FIG. 3 are both shown as rectangles, but the present invention is not limited thereto.

Incidentally, the quantity of the elastic elements 140 in this embodiment is, for example, plural as shown in FIG. 2, and the quantity of the elastic elements 140 may be adjusted according to the factors such as the force applied to the light source 120 and the heat dissipation requirements, and the present invention is not limited thereto. It can be understood that the backlight module 100 (shown in FIG. 1) in an embodiment may further include another group of light sources, and the aforementioned another group of light sources and the light source 120 may be respectively disposed on two opposite sides of the light guide plate 110. In the same way, the aforementioned another group of light sources can be pushed by another group of elastic elements and therefore maintain a fixed distance with the light guide plate 110.

Referring to FIG. 1 again, the fixing element 130 in this embodiment is, for example, a back bezel. In detail, the fixing element 130 may have a bottom wall W1 and a side wall W2 (also shown in FIG. 2) connected to the bottom wall W1, wherein the light source 120 and the light guide plate 110 may be disposed on the bottom wall W1, and the elastic element 140 may be fixed to the side wall W2. However, the specific structure of the fixing element 130 is not limited thereto.

In this embodiment, the material of the light guide plate 110 may include polymethyl methacrylate (PMMA). However, the material of the light guide plate 110 may include cyclo olefin polymer (COP) or polycarbonate (PC) in other embodiments. In addition, the light guide plate 110 in this embodiment may be made by hot compression molding or injection molding, but the present invention is not limited thereto.

Compared with the prior art, the backlight module 100 in this embodiment adopts the elastic element 140 to push against the light source 120, so that the light source 120 can be adjoined against the light incident surface 111 of the light guide plate 110, or a fixed distance can be maintained between the light source 120 and the light incident surface 111. Based on the above structures, a fixed distance between the light source 120 and the light incident surface 111 can still be maintained even if the volume of the light guide plate 110 is changed, so the backlight module 100 of the present invention is able to provide a stable optical grade. In addition, because the elastic element 140 in this embodiment pushes against the light source 120 instead of the light guide plate 110, the backlight module 100 in this embodiment can further provide more stable optical grade.

Figure 4:
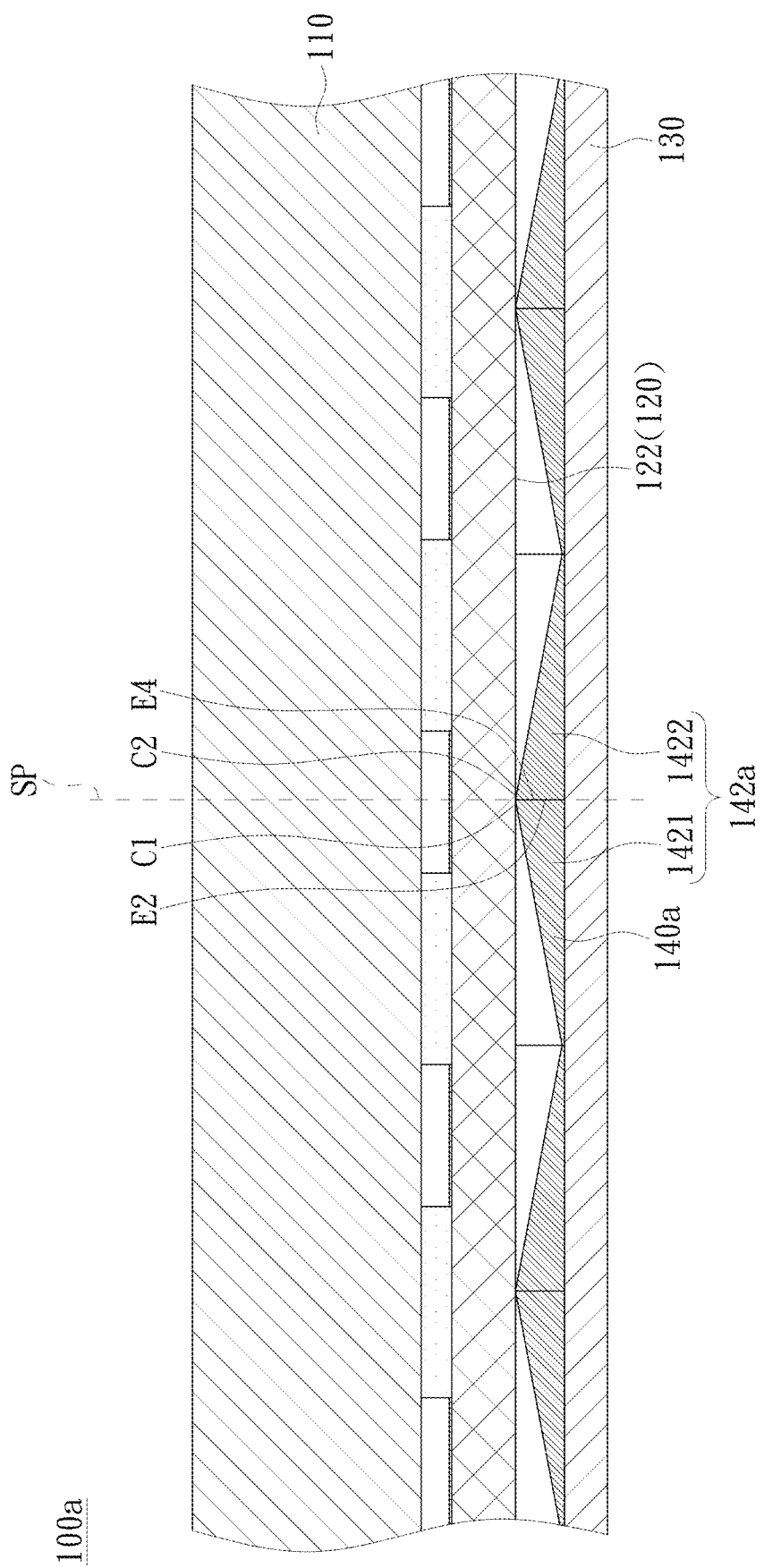
FIG. 4 is a schematic diagram of a plurality of elastic parts of a plurality of elastic elements of a backlight module pushing against the light source in another embodiment of the present invention.
Figure 5:
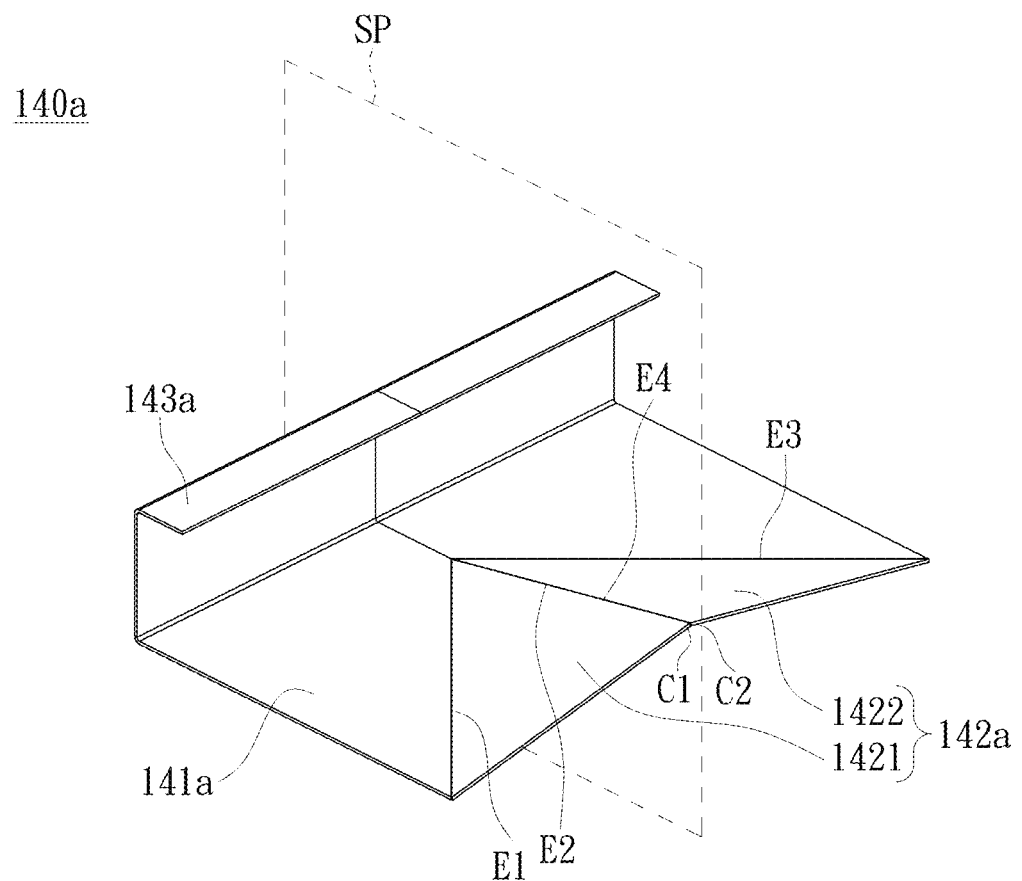
FIG. 5 is a 3D schematic diagram of the elastic element in FIG. 4.

FIG. 4 is a schematic diagram of a plurality of elastic parts of a plurality of elastic elements of a backlight module pushing against the light source in another embodiment of the present invention. FIG. 5 is a 3D schematic diagram of the elastic element in FIG. 4. The structure and the advantages of the backlight module 100a in this embodiment are similar to those of the embodiment of FIG. 1, and only the differences are described below. Referring to FIG. 4 and FIG. 5, in addition to including the first triangle 1421, the elastic part 142a further includes a second triangle 1422. The first triangle 1421 may further have a second edge E2, and the second edge E2 is adjoined between the first edge E1 and the first corner C1. The second triangle 1422 has a third edge E3, a fourth edge E4 and a second corner C2. The third edge E3 is opposite to the second corner C2, and the fourth edge E4 is adjoined between the third edge E3 and the second corner C2. The third edge E3 is connected to the base part 141a. The second edge E2 is adjoined to the fourth edge E4. The first corner C1 is adjoined to the second corner C2, and the first corner C1 and the second corner C2 adjoined to each other are adapted to be against the back side 122. In short, the elastic element 140a pushes against the light source 120 by the first triangle 1421 and the second triangle 1422. In this way, the elastic element 140a can provide the directional force to push against the light source 120 more stably and more uniformly, so that the distance between the light source 120 and the light incident surface 111 can be maintained constant, thereby making the backlight module 100a provide a more stable optical grade. In detail, the elastic part 142a has, for example, a symmetry plane SP. The symmetry plane SP passes between the second edge E2 and the fourth edge E4 adjoined to each other, and the first triangle 1421 and the second triangle 1422 are symmetrical to the symmetry plane SP. Hence, the elastic element 140a can provide the directional force to push against the light source 120 more stably and more uniformly, thereby making the backlight module 100a provide more stable optical grade. Please continue to refer to FIG. 5. Incidentally, the base part 141a and the fixing part 143a are, for example, symmetrical to the symmetry plane SP, wherein the base part 141a may be substantially perpendicular to the symmetry plane SP. In this embodiment, the base part 141a may include two trapezoids symmetrical to the symmetry plane SP, and the first triangle 1421 and the second triangle 1422 may be respectively adjoined to the hypotenuses of the two trapezoids, but the present invention is not limited thereto.

Figure 6:
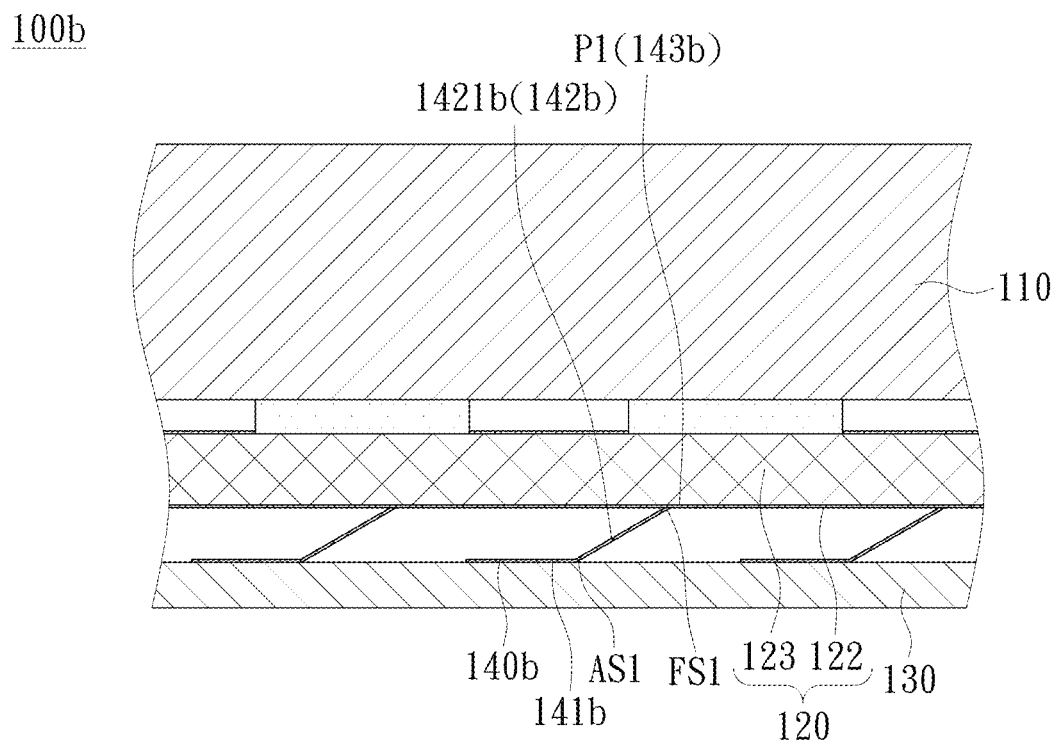
FIG. 6 is a schematic diagram of a plurality of elastic parts of a plurality of elastic elements of a backlight module pushing against the light source in another embodiment of the present invention.
Figure 7:
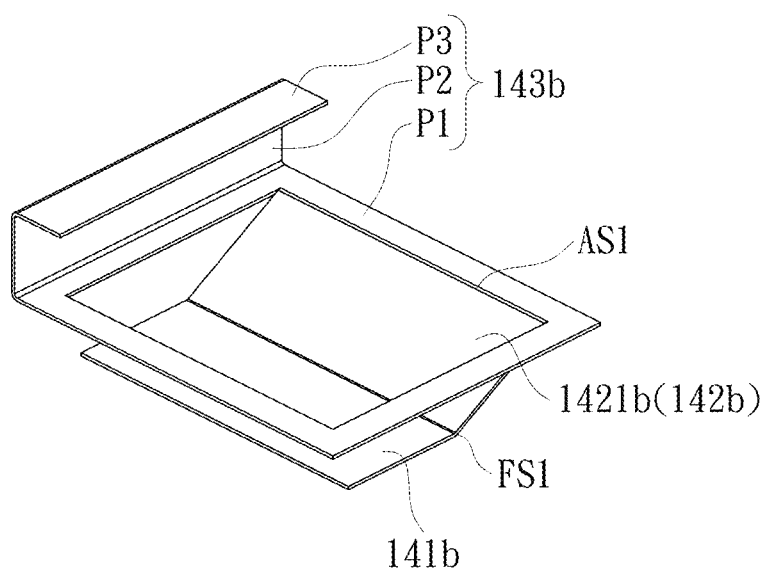
FIG. 7 is a 3D schematic diagram of the elastic element in FIG. 6.
Figure 8:
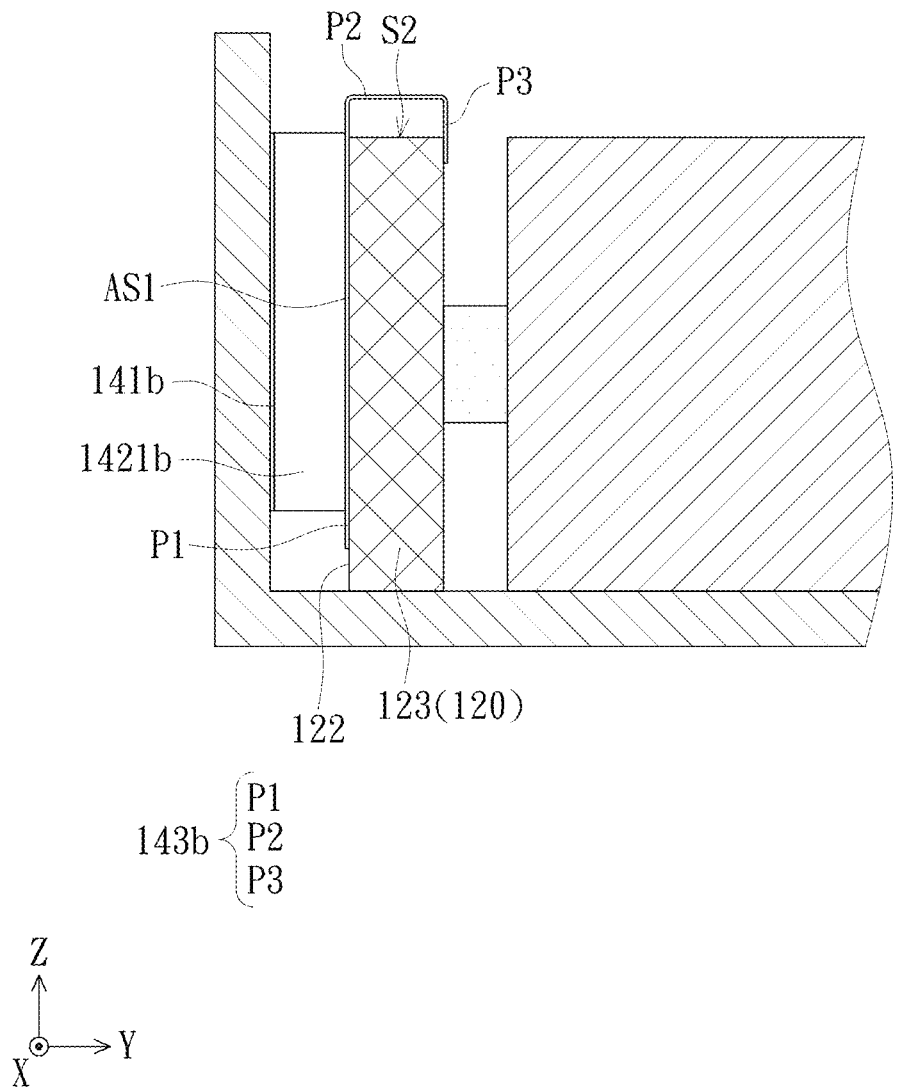
FIG. 8 is a partial cross-sectional schematic diagram of the backlight module in FIG. 6.

FIG. 6 is a schematic diagram of a plurality of elastic parts of a plurality of elastic elements of a backlight module pushing against the light source in another embodiment of the present invention. FIG. 7 is a 3D schematic diagram of the elastic element in FIG. 6. FIG. 8 is a partial cross-sectional schematic diagram of the backlight module in FIG. 6. The structure and advantages of the backlight module 100b in this embodiment are similar to those of the embodiment of FIG. 1, and only the differences are described below. Please refer to FIG. 6 and FIG. 7 first. The elastic part 142b of the elastic element 140b may include a first quadrilateral 1421b, and the first quadrilateral 1421b has a first fixed side FS1 and a first abutted side AS1. The first fixed side FS1 is connected to the base part 141b. The first abutted side AS1 is opposite to the first fixed side FS1, and the first abutted side AS1 is adapted to be against the back side 122. Furthermore, the first quadrilateral 1421b may be a rectangle, and the first abutted side AS1 and the first fixed side FS1 are, for example, two opposite long edges of the rectangle. In addition, the first fixed side FS1 is, for example, adjoined to the base part 141b. Incidentally, the base part 141b may be a quadrilateral, but the present invention is not limited thereto. In this embodiment, the fixing part 143b may be plate-shaped and is connected to the first abutted side AS1. The fixing part 143b is adapted to be against the back side 122. In detail, the plate-shaped fixing part 143b can increase the area contacting with the light source 120. Hence, the fixing part 143b can be more firmly fixed to the light source 120 and can further improve the heat dissipation efficiency to the light source 120. Refer to FIG. 7 and FIG. 8 together. In this embodiment, the fixing part 143b may have a first plate body P1, a second plate body P2 and a third plate body P3. The first plate body P1 is connected to the first abutted side AS1 and opposite to the third plate body P3. The second plate body P2 is connected to the first plate body P1 and the third plate body P3. The substrate 123 is clamped between the first plate body P1 and the third plate body P3. In this way, the fixing part 143b can be more firmly fixed to the light source 120, and the area of the fixing part 143b contacting with the light source 120 can be further increased, thereby further improving the heat dissipation efficiency of the fixing part 143b on the light source 120. Specifically, the first plate body P1 and the third plate body P3 may clamp the two opposite sides of the substrate 123, and the second plate body P2 is separated from the side surface S2 of the substrate 123. However, the second plate body P2 may contact with the side surface S2 of the substrate 123 in an embodiment. Incidentally, as shown in FIG. 7, the first plate body P1 in this embodiment may be adjoined to the first abutted side AS1, and the first plate body P1 may be frame-shaped, but the present invention is not limited thereto.

Figure 9:
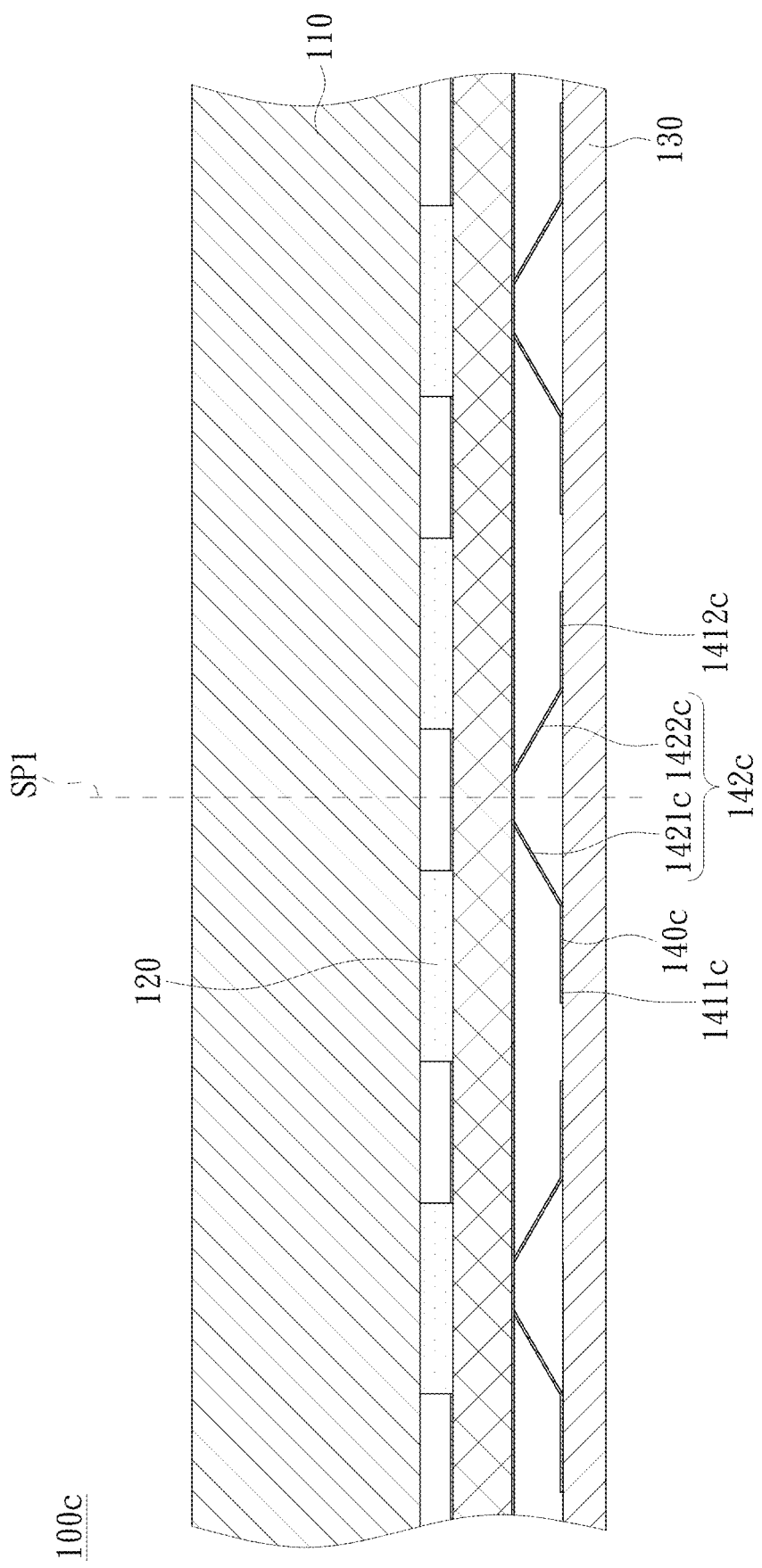
FIG. 9 is a schematic diagram of a plurality of elastic parts of a plurality of elastic elements of a backlight module pushing against the light source in another embodiment of the present invention.
Figure 10:
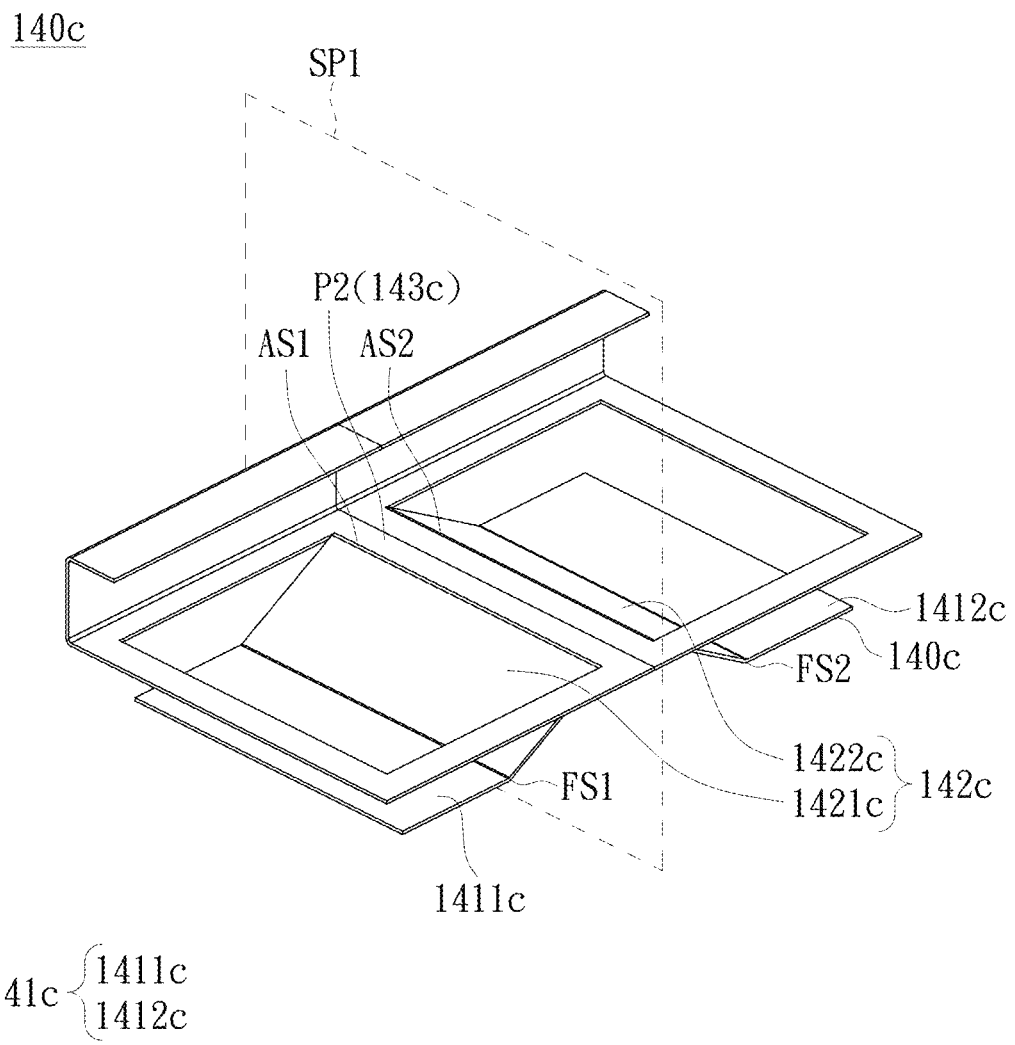
FIG. 10 is a 3D schematic diagram of the elastic element in FIG. 9.

FIG. 9 is a schematic diagram of a plurality of elastic parts of a plurality of elastic elements of a backlight module pushing against the light source in another embodiment of the present invention. FIG. 10 is a 3D schematic diagram of the elastic element in FIG. 9. The structure and advantages of the backlight module 100c in this embodiment are similar to those of the embodiment in FIG. 6, and only the differences are described below. Referring to FIG. 9 and FIG. 10, the elastic part 142c of the elastic element 140c further includes, for example, a second quadrilateral 1422c. The base part 141c (shown in FIG. 10) may include a first part 1411c and a second part 1412c separated from each other. The first fixed side FS1 is connected to the first part 1411c. The second quadrilateral 1422c has a second fixed side FS2 and a second abutted side AS2. The second fixed side FS2 is connected to the second part 1412c. The second fixed side FS2 is connected to the second part 1412c. The second abutted side AS2 is opposite to the second fixed side FS2 and is connected to the first abutted side AS1. The elastic part 142c further has a symmetry plane SP1 passing between the first abutted side AS1 and the second abutted side AS2, and the first quadrilateral 1421c and the second quadrilateral 1422c are symmetrical to the symmetry plane SP1. In this way, the elastic part 142c can apply the force on the light source 120 more stably and more uniformly, so that the distance between the light source 120 and the light incident surface 111 can be more easily maintained constant, thereby making the backlight module 100c provide a more stable optical grade. Specifically, as shown in FIG. 10, the first abutted side AS1 and the second abutted side AS2 can be connected to the second plate body P2 of the fixing part 143c, and the symmetry plane SP1 can pass through a part of the second plate body P2 located between the first abutted side AS1 and the second abutted side AS2. In addition, the first part 1411c and the second part 1412c may be symmetrical to the symmetry plane SP1, and the fixing part 143c may be symmetrical to the symmetry plane SP1. In this embodiment, the symmetry plane SP1 is, for example, substantially perpendicular to the first part 1411c and the second part 1412c. The features of the second quadrilateral 1422c are similar to those of the first quadrilateral 1421c, and no redundant detail is to be given herein.

Figure 11:
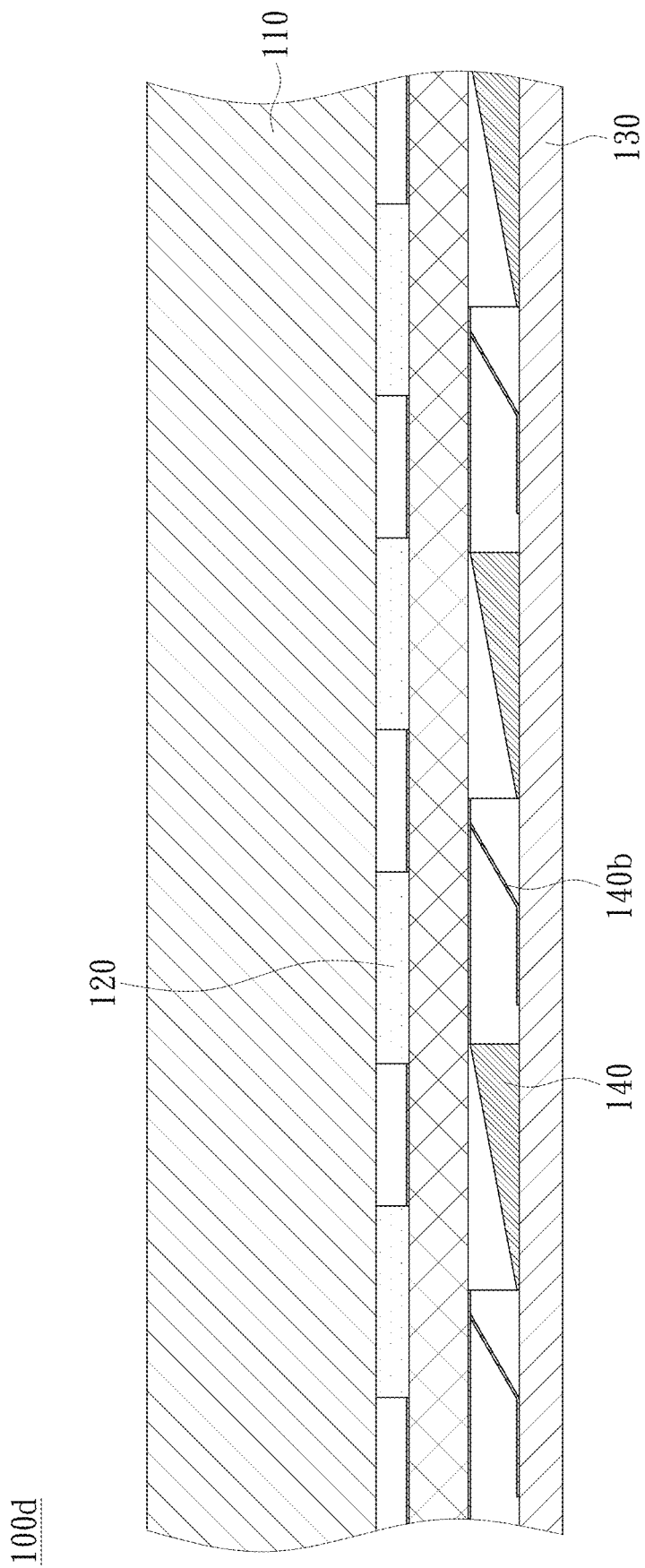
FIG. 11 is a schematic diagram of a plurality of elastic parts of a plurality of elastic elements of a backlight module pushing against the light source in another embodiment of the present invention.
Figure 12:
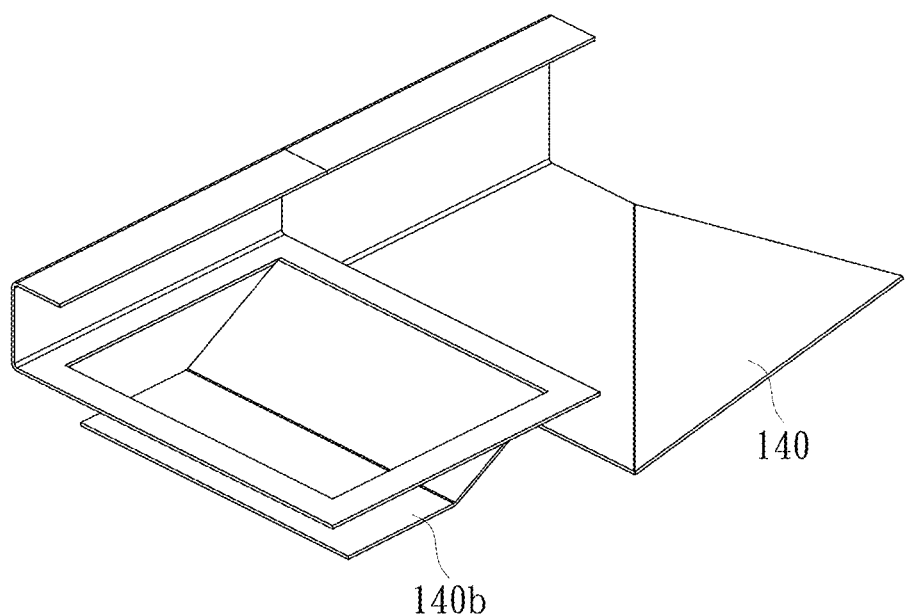
FIG. 12 is a 3D schematic diagram of the elastic element in FIG. 11.

FIG. 11 is a schematic diagram of a plurality of elastic parts of a plurality of elastic elements of a backlight module pushing against the light source in another embodiment of the present invention. FIG. 12 is a 3D schematic diagram of the elastic element in FIG. 11. The structure and advantages of the backlight module 100d in this embodiment are similar to those of the embodiments in FIG. 1 and FIG. 6, and only the differences are described below. Referring to FIG. 11 and FIG. 12, the backlight module 100d in this embodiment can adopt both of the elastic element 140 in FIG. 3 and the elastic element 140b in FIG. 7. Specifically, the elastic element 140 and the elastic element 140b can be interleaved with each other, but the way how to arrange the elastic element 140 and the elastic element 140b is not limited thereto.

In summary, the backlight module of the present invention adopts the elastic element to push against the light source, so that the light source can be adjoined against the light incident surface of the light guide plate, or a fixed distance between the light source and the light incident surface can be maintained. Based on the above structures, a fixed distance between the light source and the light incident surface can still be maintained even if the volume of the light guide plate is changed, so the backlight module of the present invention is able to provide a stable optical grade.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a light guide plate, having a light incident surface;
   a light source, having a light-emitting side and a back side opposite to the light-emitting side, wherein the light-emitting side faces the light incident surface;
   a fixing element, disposed to be opposite to the back side; and
   an elastic element, connected to the fixing element, wherein the elastic element is adapted to push the light source to be against the light incident surface;
   wherein the elastic element is plate-shaped and has a base part and an elastic part, the base part is fixed to the fixing element and is opposite to the back side, the elastic part is connected to the base part and is bent relative to the base part, and the elastic part is adapted to be against the back side;
   wherein the elastic element is formed by cutting and folding a metal sheet.

2. The backlight module according to claim 1, wherein the elastic part comprises a first triangle, the first triangle has a first edge and a first corner opposite to the first edge, the first edge is connected to the base part, and the first corner is adapted to be against the back side.

3. The backlight module according to claim 2, wherein the elastic part further comprises a second triangle;

the first triangle further has a second edge, and the second edge is adjoined between the first edge and the first corner;

the second triangle has a third edge, a fourth edge and a second corner, the third edge is opposite to the second corner, the fourth edge is adjoined between the third edge and the second corner, and the third edge is connected to the base part; and the second edge is adjoined to the fourth edge, the first corner is adjoined to the second corner, and the first corner and the second corner adjoined to each other are adapted to be against the back side.

4. The backlight module according to claim 3, wherein the elastic part has a symmetry plane, the symmetry plane passes between the second edge and the fourth edge adjoined to each other, and the first triangle and the second triangle are symmetrical to the symmetry plane.

5. The backlight module according to claim 1, wherein the elastic part comprises a first quadrilateral, the first quadrilateral has a first fixed side and a first abutted side, the first fixed side is connected to the base part, and the first abutted side is opposite to the first fixed side and is adapted to be against the back side.

6. The backlight module according to claim 5, wherein the elastic part further comprises a second quadrilateral, the base part comprises a first part and a second part separated from the first part;

the first fixed side is connected to the first part;

the second quadrilateral has a second fixed side and a second abutted side, the second fixed side is connected to the second part, and the second abutted side is opposite to the second fixed side and is connected to the first abutted side; and the elastic part further has a symmetry plane passing between the first abutted side and the second abutted side, and the first quadrilateral and the second quadrilateral are symmetrical to the symmetry plane.

7. The backlight module according to claim 1, wherein the elastic element further has a fixing part, the light source comprises a substrate and a light-emitting element, the light-emitting element is disposed on the substrate, and the light-emitting side is located on a side of the light-emitting element away from the substrate, the back side is located on a side of the substrate away from the light-emitting element, and the fixing part is connected to the base part and is fixed to the substrate.

8. The backlight module according to claim 7, wherein the substrate has a surface and a side surface, the surface is opposite to the back side, the side surface is connected to the surface, the fixing part is plate-shaped and has a first segment and a second segment, the first segment is connected to the second segment and the base part, the first segment is opposite to the side surface, and the second segment is fixed to the surface.

9. The backlight module according to claim 7, wherein the elastic part has a first fixed side and a first abutted side, the first fixed side is connected to the base part, the first abutted side is opposite to the first fixed side and is adapted to be against the back side, the fixing part is plate-shaped and is connected to the first abutted side, and the fixing part is adapted to be against the back side.

10. The backlight module according to claim 9, wherein the fixing part has a first plate body, a second plate body and a third plate body, the first plate body is connected to the first abutted side, the first plate body is opposite to the third plate body, the second plate body is connected to the first plate body and the third plate body, and the substrate is sandwiched between the first plate body and the third plate body.

* * * * *